July 26, 1949.   H. J. EISENHAUER, SR   2,477,051
ANTISKID DEVICE

Filed Aug. 20, 1948   3 Sheets-Sheet 1

INVENTOR.
Harry J. Eisenhauer Sr.
BY Bean, Brooks, Buckley & Bean
ATTORNEYS.

July 26, 1949. H. J. EISENHAUER, SR 2,477,051
ANTISKID DEVICE

Filed Aug. 20, 1948 3 Sheets-Sheet 3

INVENTOR.
Harry J. Eisenhauer Sr.
BY Bean, Brooks, Buckley & Bean.
ATTORNEYS.

Patented July 26, 1949

2,477,051

UNITED STATES PATENT OFFICE 2,477,051

ANTISKID DEVICE

Harry J. Eisenhauer, Sr., Buffalo, N. Y.

Application August 20, 1948, Serial No. 45,222

9 Claims. (Cl. 152—225)

My invention relates in general to anti-skid devices, and particularly to an anti-skid device having a plurality of arms which are retractable into engagement with the tire of an automobile.

The principal object of my invention is to provide a device which may be readily applied to an automobile tire without having to jack up the wheel.

Another object has been to provide a device which may be applied to the tire without the use of any tools.

A further object is to provide a device having tire engaging members so shaped that when applied and clamped in position will provide sharp, road engaging anti-skid surfaces.

Moreover, my device is collapsible so as to occupy relatively small space when not in use.

The above objects and advantages have been accomplished by the device shown in the accompanying drawings, of which:

Figure 1:
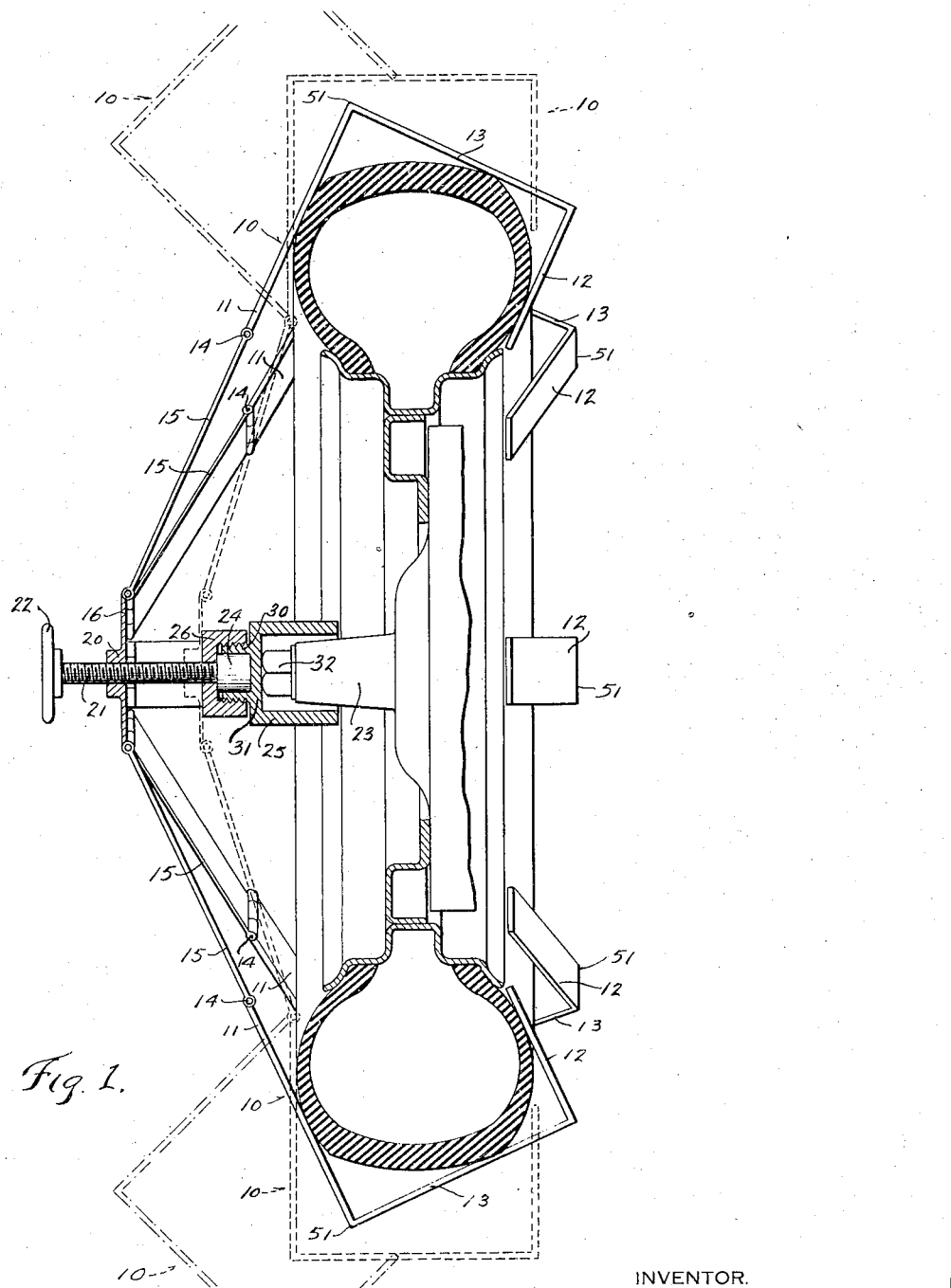
Fig. 1 is a sectional elevation of my device as applied to an automobile wheel and tire.
Figure 2:
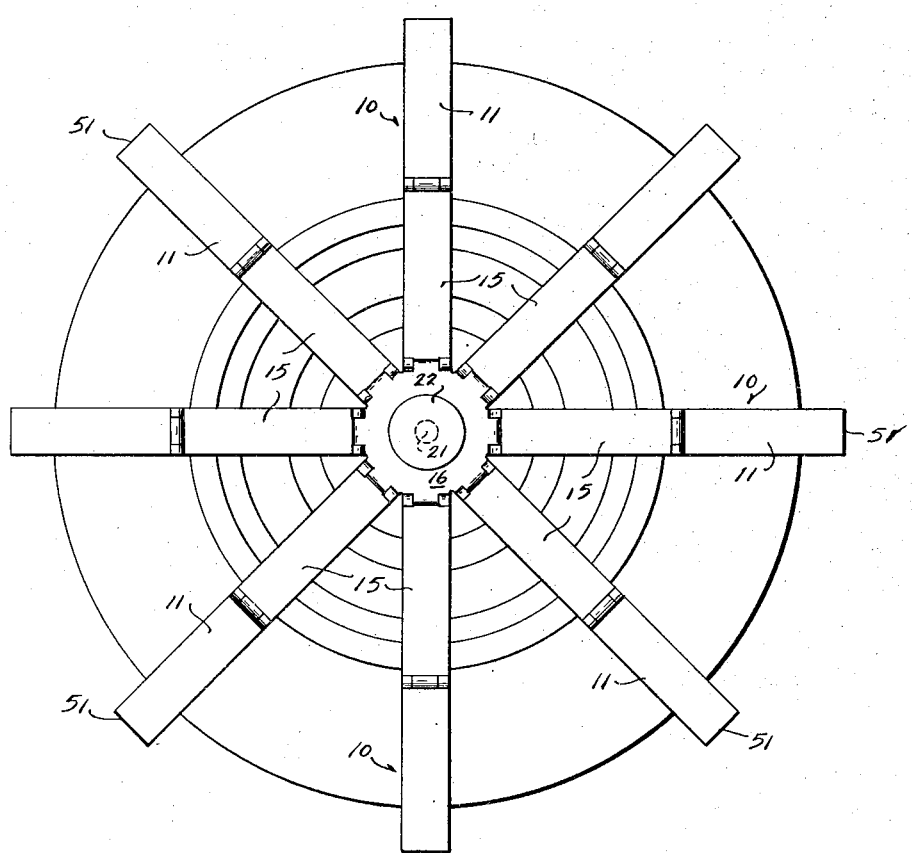
Fig. 2 is a face view thereof.

The form of my invention shown in Figs. 1 and 2 comprises a plurality of tire-engaging members 10. Each of these members is preferably of U-shaped form having a pivot arm 11 and a tire arm 12 connected together by means of a road-engaging portion 13. As shown in Fig. 1, when in position the tire arm will engage the rear face of the tire, the road-engaging portion 13 will extend across the tread of the tire, and the pivot arm 11 will extend radially toward the axis of the wheel.

Each of the pivot arms 11 is hingedly attached at 14 to a connecting arm 15. These connecting arms radiate toward the center of the wheel where they are pivotally united to a clamping member 16. This clamping member is preferably in the form of a disc having a centrally arranged screw-threaded hub 20 for the reception of a clamping screw 21. Actuating means, preferably in the form of a hand wheel 22, is secured to the outer end of the screw whereby the same may be readily rotated by hand.

The clamping screw 21, when in position, has its axis substantially with the axis of the wheel axle, and its inner end extends inwardly toward the wheel hub 23. The inner end of the screw is provided with a swivel portion 24 rotatably mounted within an abutment sleeve 25; and it is held against axial movement therewith by means of a swivel coupling 26 screw-threaded to a projection 30 formed on the sleeve. By means of this swivel arrangement, the abutment sleeve and clamping screw will be firmly maintained in coaxial relation, while at the same time permitting free swiveling movement of the screw abutment within the sleeve.

As shown in Figs. 1 and 2, the abutment sleeve 25 is designed to engage the hub 23 of the automobile wheel and to have its end wall 31 tightly engaged with the end of the axle of the wheel or axle nut 32. While I have shown a sleeve for engaging a wheel hub, it is obvious that the abutment may be made in any suitable shape to actuate different axle or wheel constructions, it only being desirable that the abutment be substantially centralized by its engagement with the wheel or axle part and held in such centralized position when the device is clamped in position and while it is in use. Such a modification is shown in Fig. 3 where a cylindrical abutment 27 is adapted to engage an aperture in the end of the wheel axle.

Figures 3, 4:
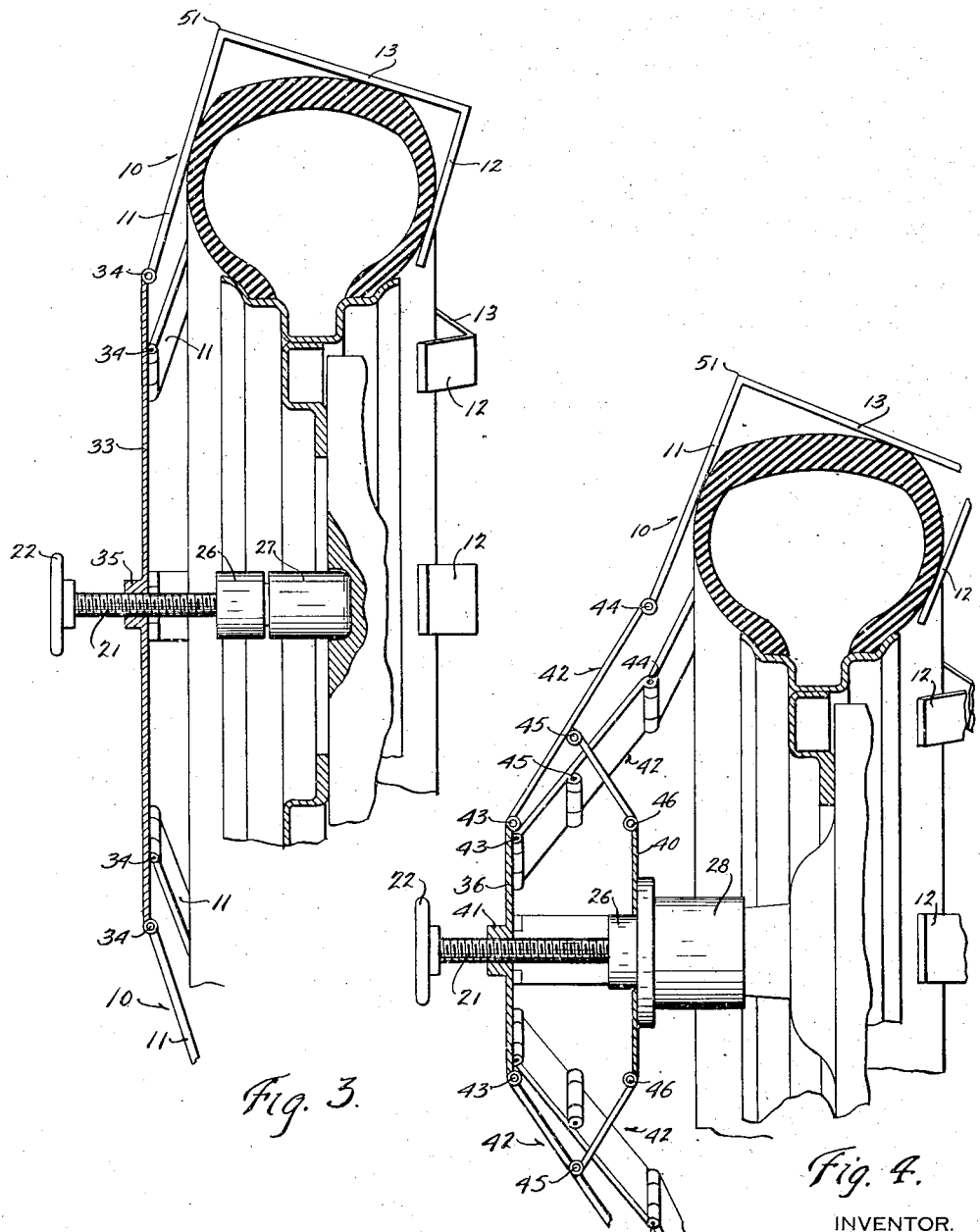
Fig. 3 is a fragmentary sectional view of a modified form of my device.
Fig. 4 is a similar view of another modified form of structure.

In the form of invention shown in Fig. 3, a clamping member or disc 33 is used which is preferably in the form of a disc of a diameter substantially equal to the diameter of the tire rim, thereby dispensing with the use of the connecting arms 15 of the form of invention of Fig. 1. The tire engaging members 10 are pivotally connected directly to the disc at pivot points 34. The disc 33 is provided with an interiorly screw-threaded hub 35 for the reception of the clamping screw 21.

In the form of invention shown in Fig. 4, I employ two clamping members or discs 36 and 40. The disc 36 is formed with a screw-threaded hub 41 for engagement with the clamping screw 21, and the disc 40 is preferably secured to the abutment member 28. In this form of invention the tire engaging members 10 are connected to the disc 36 by means of pivot arms 42. Each of these arms is pivotable at one end to the disc 36 at a pivot point 43, and at its opposite end to the tire engaging member 10 at a pivot point 44. Arranged substantially midway the length of the connecting arm 42 is a pivot 45, and connecting this pivot with a pivot 46, carried by the stationary disc 40, is an auxiliary clamping arm 50. The connecting arms are substantially rigid and the use of the auxiliary clamping arm serves to tie the two discs together in pivotal manner and also serves to draw the pivot 44 inwardly toward the wheel when the clamping member 36 is moved outwardly to clamp the tire engaging members in position.

When the device is to be applied to a tire, the hand wheel 22 is rotated to actuate the screw 21 in the proper direction so as to draw the clamping member 16 inwardly toward the abutment 25 and to a position shown in dotted lines in Fig. 1. In this position, the pivot points 14 uniting the tire engaging members with the connecting arms 15 will be moved outwardly in radial direction away from the center of the tire, thereby lengthening the distance between pivot points 14. The lengths of the pivot arms 11 and tire arms 12 of the tire-engaging members are so proportioned that when the pivots 14 are in the dotted line positions of Fig. 1, these members may be moved around the pivots 14 from the positions shown by the dot and dash lines to the position shown by the dotted lines. When thus applying the device to a tire, the abutment sleeve 25 is engaged with the hub 23 of the wheel or other centrally arranged portion thereof and the tire engaging members are engaged with the tire, one at a time, in the manner just above described. If necessary to engage the members which are located near the bottom of the tire and close to the pavement, it is only necessary to roll the vehicle forwardly or backwardly over the adjacent engaged members, whereupon the remaining members may be engaged with the tire. When all the members have been placed in the position shown by the dotted lines in Fig. 1, the screw 21 is actuated to push the abutment means 25 tightly into contact with the engaged wheel part and to force the clamping member 16 outwardly on the screw and away from the abutment 25, thereby drawing the pivot points 14 inwardly in radial manner and causing the tire engaging members to be clamped about the tire, as shown in full lines in Fig. 1.

It will be observed by reference to Fig. 1 that when the tire engaging members 10 are in clamping engagement with the tire, they will be canted to the position shown by the full lines in which position the corner or edge 51 joining the pivot arm 11 and the road-engaging portion 13 will be projected above the tread of the tire and will present to the road a sharp road-engaging edge which will provide an effective traction surface for engagement with the roadbed to prevent spinning of the wheel in dirt, sand or the like, or upon ice or snow. While I have shown the corners or edges 51 as providing the traction surface for the tire engaging members, it is obvious that the road engaging portion 13 thereof may be suitably formed or provided with any one of a number of well known traction means.

Obviously, when it is desired to remove my device from the tire, it is only necessary to reverse the screw 21 and thereby move the clamping member 16 inwardly toward the abutment, whereupon the clamping members may be pivoted outwardly around the pivots 14 and away from their tire-engaging positions, whereupon the device may be completely removed and collapsed for storage. It is obvious that the screw-threads formed on the clamping screw 21 will be right-handed and left-handed as to pitch for opposite sides of the vehicle, and the device having the proper handed pitch will be used on the proper wheel, whereby if there is any tendency to rotate, the screw will increase the clamping action of the clamping members.

Obviously, some modifications of the details herein shown and described may be made without departing from the spirit of my invention or the scope of the appended claims, and I do not, therefore, wish to be limited to the exact embodiment herein shown and described.

What is claimed is:

1. The combination with an automobile wheel and a tire carried thereby, of an anti-skid device, comprising a plurality of radially movable tire-engaging members, an axially movable clamping member arranged near the center of the wheel, connecting means for pivotally uniting said tire-engaging members to said clamping member, and expanding means arranged between said clamping member and the wheel, whereby the clamping member may be forced outwardly away from the wheel to draw said tire-engaging members into clamping engagement with the tire.

2. The combination with an automobile wheel and a tire carried thereby, of an anti-skid device, comprising a plurality of radially arranged tire members each formed at its outer end with a U-shaped arm for engagement with the tire, a clamping disc arranged at the center of the wheel, hinge means for connecting the inner ends of said tire members to said disc, and expanding means carried by said disc and having abutting engagement with said wheel, whereby the disc may be forced away from the wheel to bring the tire engaging members in clamping relation with the tire.

3. The combination with an automobile wheel and a tire carried thereby, of an anti-skid device, comprising a plurality of radially arranged tire-engaging members, a clamping member arranged near the center of the wheel, means carried by the clamping member for pivotally attaching said tire-engaging members thereto, and expanding means arranged between said clamping member and the wheel, whereby the clamping member may be forced outwardly away from the wheel to draw said tire-engaging members into clamping engagement with the tire.

4. The combination with an automobile wheel and a tire carried thereby, of an anti-skid device, comprising a plurality of radiating tire-engaging members of U-shape formation, a clamping disc arranged at the center of the wheel, hinge means for connecting the inner ends of said members to said disc, a screw carried by said disc and rotatable relatively therewith, abutment means carried by the inner end of said screw for engagement with the wheel, and means carried at the outer end of the screw for rotating the same, whereby the disc may be forced away from the abutment means to bring the tire engaging members in clamping relation with the tire.

5. The combination with an automobile wheel and a tire carried thereby, of an anti-skid device, comprising a plurality of radially arranged tire-engaging members, two spaced clamping discs arranged at the center of the wheel, an abutment carried by one disc and engageable with said wheel, a clamping screw in screw-threaded engagement with the other disc and having a swivel at its inner end for rotatable engagement with the first mentioned disc, whereby said discs may be forced apart, a pivot arm connecting the tire-engaging members with the first mentioned disc, and a connecting arm pivotally uniting each of said connecting arms to said other disc.

6. An anti-skid device, comprising a plurality of U-shaped tire-engaging members, a centrally arranged clamping member, means for pivotally attaching said tire-engaging members to said clamping member, an abutment member, and expanding means carried by said clamping member and engageable with said abutment member, whereby said clamping member may be moved axially toward and away from said abutment member to move said tire-engaging members radially to and from tire-engaging positions.

7. An anti-skid device, comprising a plurality of U-shaped tire-engaging members, a centrally arranged clamping member, radially arranged means for pivotally attaching said tire-engaging members to said clamping member, an abutment member, and screw means carried by said clamping means and engageable with said abutment member, whereby said clamping member may be moved axially toward and away from said abutment member to move said tire-engaging members radially to and from tire-engaging positions.

8. An anti-skid device, comprising a plurality of U-shaped tire-engaging members, a centrally arranged clamping member, radially arranged means for pivotally attaching said tire-engaging members to said clamping member, an abutment member, screw means carried by said clamping means and engageable with said abutment member, and swivel means connecting said screw to said abutment means, whereby said clamping member may be moved axially toward and away from said abutment member to move said tire-engaging members radially to and from tire-engaging positions.

9. An anti-skid device, comprising a plurality of U-shaped tire engaging members, two spaced centrally arranged clamping discs, an abutment carried by one of said discs, a clamping screw carried by the other disc and having screw-threaded engagement therewith, a swivel carried at the inner end of said screw and rotatably attached to the first mentioned disc in substantially axially rigid manner, a pivot arm connecting the first mentioned disc to said tire-engaging members, and a pivot arm connecting each connecting arm to said other disc.

HARRY J. EISENHAUER, Sr.

REFERENCES CITED

The following references are of record in the file of this patent:

UNITED STATES PATENTS

| Number | Name | Date |
| --- | --- | --- |
| 1,306,730 | Willis | June 17, 1919 |